Fig.1.

C. T. SMALL.
CAN FILLING MACHINE.
APPLICATION FILED JAN. 15, 1914.

1,154,665.

Patented Sept. 28, 1915.
6 SHEETS—SHEET 6.

WITNESSES:
Chas. A. Becker
W. A. Alexander.

INVENTOR
C. T. Small,
BY
E. E. Huffman
ATTORNEY

UNITED STATES PATENT OFFICE.

CHESLEY T. SMALL, OF ST. LOUIS, MISSOURI.

CAN-FILLING MACHINE.

1,154,665.

Specification of Letters Patent.

Patented Sept. 28, 1915.

Application filed January 15, 1914. Serial No. 812,236.

*To all whom it may concern:*

Be it known that I, CHESLEY T. SMALL, a citizen of the United States of America, residing at the city of St. Louis, State of Missouri, have invented a certain new and useful Can-Filling Machine, of which the following is such a full, clear, and exact description as will enable any one skilled in the art to which it appertains to make and use the same, reference being had to the accompanying drawings, forming part of this specification.

My invention relates to a can filling machine and, more particularly, to that class of machines in which the cans are delivered to a rotary member carrying a plurality of measures from which the material is delivered to the cans.

In the accompanying drawings, which illustrate a can filling machine made in accordance with my invention.

Like marks of reference refer to similar parts in the several views of the drawings.

Figure 1:
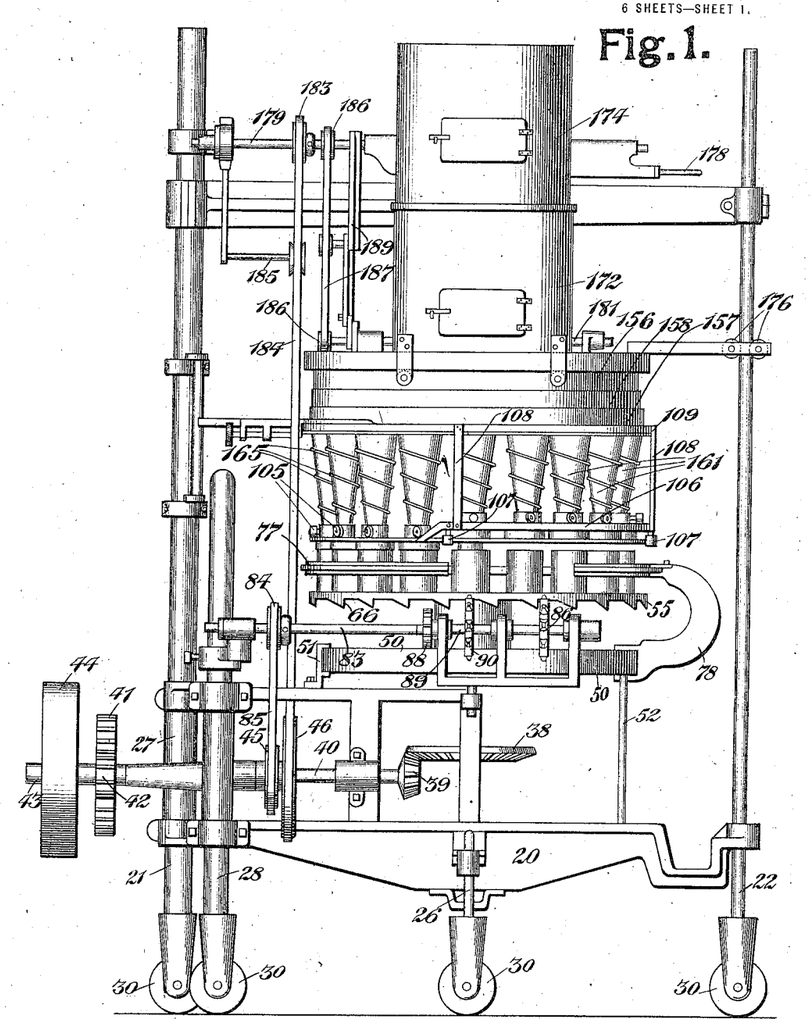
Figure 1 is a front elevation.
Figures 4, 5, 6:
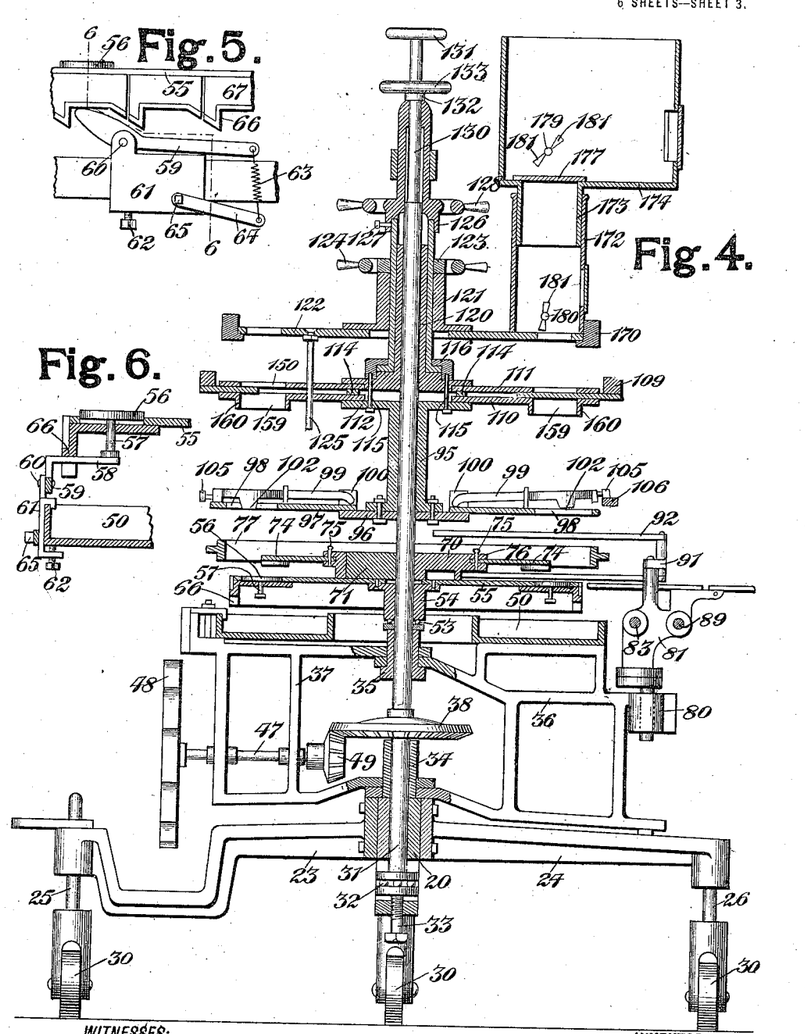
Fig. 4 is a vertical section, some of the parts being omitted.
Fig. 5 is an enlarged view showing a detail of construction.
Fig. 6 is a view taken on the line 6—6 of Fig. 5.
Figure 12:
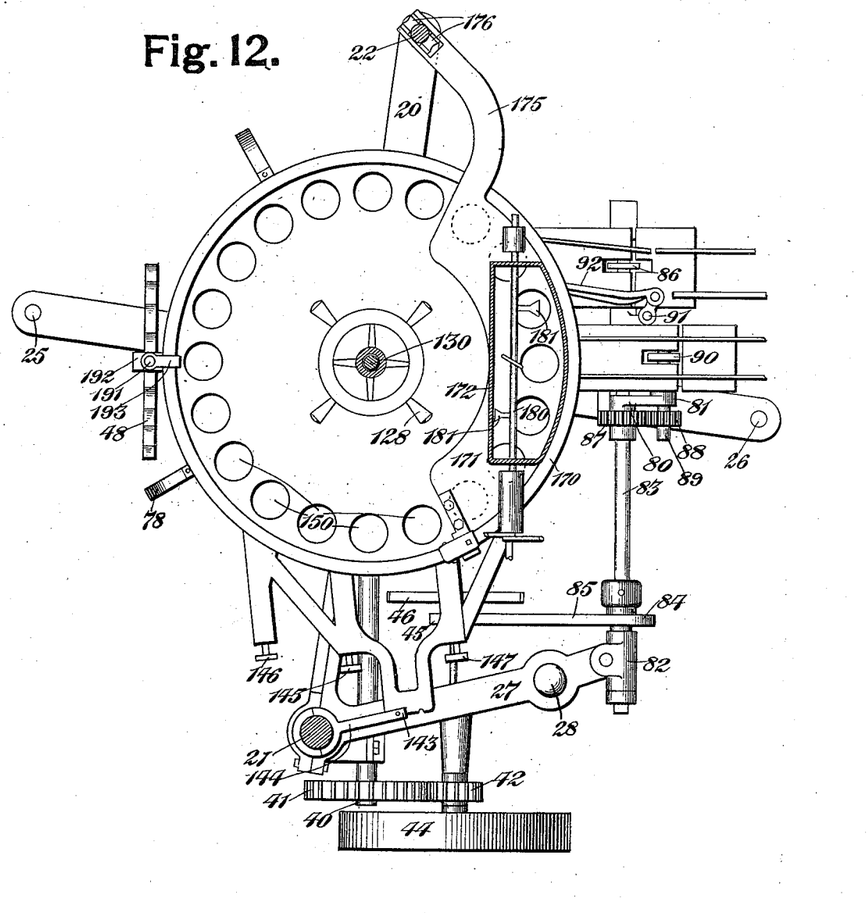
Fig. 12 is a plan view of a complete machine, some of the parts being shown in section.

The base of the machine consists of a cross beam 20 carrying uprights 21 and 22, two laterally projecting arms 23 and 24, carrying rods 25 and 26 respectively, and a frame 27 placed at an angle to the cross beam 20, as best shown in Fig. 12 of the drawings. This frame 27 also carries a short upright 28. The uprights 21, 22 and 28 and the rods 25 and 26, all serve as feet supporting the machine, and each is preferably supplied with a roller 30 for facilitating the movement of the machine from place to place. Mounted in the cross beam 20 is the lower end of a shaft 31 which carries the main revolving parts of the machine. This shaft 31 is preferably supported by an end thrust ball bearing 32, as shown in Fig. 4, and it can be vertically adjusted by means of a set screw 33. Surrounding the shaft 31 are a pair of sleeves 34 and 35 carrying frames 36 and 37. Keyed to the shaft 31 between these sleeves 34 and 35 is a bevel gear wheel 38 which meshes with a small bevel gear wheel 39 on a shaft 40, which is mounted in the frame 27. This shaft 40 has secured to its end a gear wheel 41 which, in turn, meshes with the gear wheel 42 carried on the driving shaft 43. This driving shaft 43 is provided with a belt wheel 44 to which power from any suitable source is supplied for driving the machine. The shaft 43 is also supplied with belt wheels 45 and 46 for driving the can feed mechanism and the agitating mechanism for the material, as will be hereinafter described. The frame 37 also carries a short shaft 47 on the end of which is carried a ratchet shaped wheel 48 for operating a striking mechanism for dislodging the powder or other material, as will be hereinafter described. On the end of the shaft 47 is a bevel gear wheel 49 meshing with the wheel 38. Carried on the frames 36 and 37 is an annular shaped pan 50 for catching any of the material which may pass down through the machine. This pan 50 is also supported at its sides by a short bracket 51 and an upright 52, as is shown in Fig. 1 of the drawings. Arranged on the upper end of the sleeve 35 is an end thrust ball bearing 53 upon which rests a hub 54 keyed to the main shaft 31 so as to be incapable of rotation independently thereof. This hub 54 carries a disk 55 upon which the cans to be filled are to be supported. In place, however, of supporting the cans directly on this disk, I provide a number of circular can supporting members 56 which are best shown in Fig. 6 of the drawings. Each of these can supporting members 56 is capable of slight vertical movement and is provided with a pin 57 projecting downwardly and adapted to be struck by an arm 58 carried on a lever 59, shown in detail in Figs. 5 and 6. This lever 59 is pivoted at 60 to a bracket 61 secured by means of a set screw 62 to the edge of the pan 50. The end of the lever 59 has secured to it one end of a coil spring 63, the opposite end of which is secured to arm 64, the position of which may be adjusted by means of a screw 65. The arm 58 is adapted to be actuated by means of the teeth 66 formed on a downwardly extending flange 67 carried by the disk 55. It will be evident that when the disk is rotated, the lower end of each of the pins 57 will be struck by the arm 58 so as to move the member 56, together with the can which it carries, through a short vertical distance and thus cause the settling of the material within the can.

Figures 2, 3:
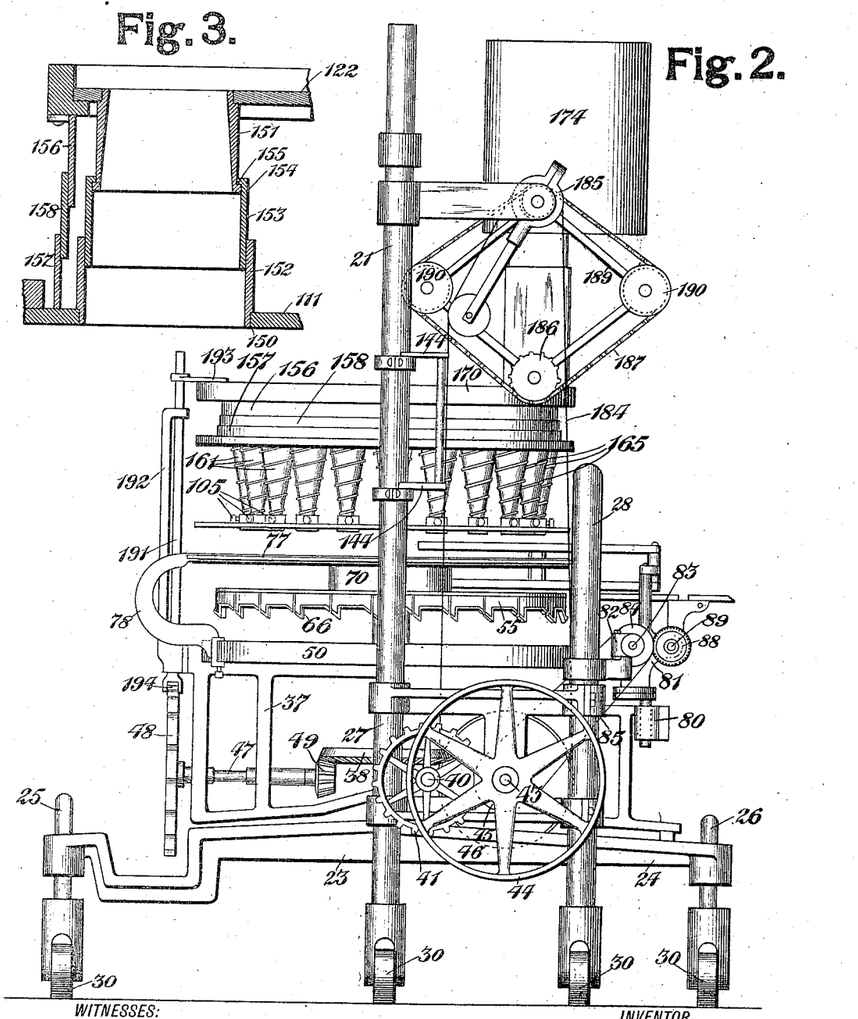
Fig. 2 is a side elevation.
Fig. 3 is an enlarged sectional view showing the construction of the measures.
Figures 7, 8, 9, 10, 11:
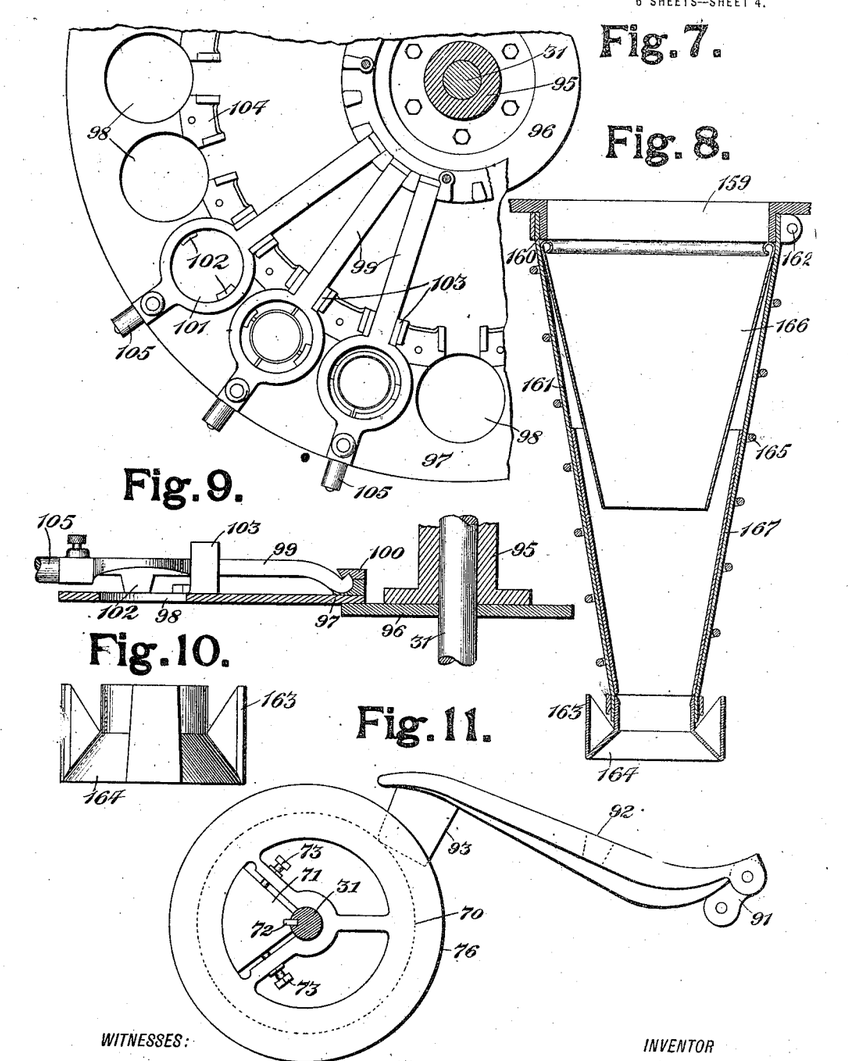
Fig. 7 is an enlarged plan view showing the mechanism for raising and lowering the discharge nozzles.
Fig. 8 is an enlarged section through one of the funnels.
Fig. 9 is a sectional view of the parts shown in Fig. 7.
Fig. 10 is an enlarged side view of one of the discharge nozzles.
Fig. 11 is an enlarged top plan view, showing a detail of construction.

Arranged above the disk 55 is a hub 70, as shown in Fig. 4 and Fig. 11 of the drawings. This hub 70 is provided with a triangular part 71 which is secured to the shaft 31 by means of a key 72. Bearing against the sides of this triangular part 71 are a pair of set screws 73, by means of which the hub 70 can be rotated a slight distance relative to the shaft 31 so as to bring the can guides into perfect alinement with the measures. The can guides 74 are secured by means of tapered pins 75 to a flange 76 carried on the hub 70, as best shown in Fig. 4. A guard surrounds the can guides 74 except at the point where the cans enter and leave the machine. This guard 77 is supported from the pan 50 by means of brackets 78, as best shown in Figs. 1 and 2 of the drawings. Supported in a bearing 80, carried by the frame 36, is a bracket 81 which forms the termination of the conveyers for delivering cans to and carrying them away from the machine. Mounted in the bracket 81 and a bearing 82 carried by the upright 28 is a shaft 83 which is provided with a belt wheel 84 driven by a belt 85 passing around it and the wheel 45 on the shaft 43 hereinbefore referred to. The shaft 83 is provided with a sprocket wheel 86 for driving any suitable conveyer to convey the cans from the machine. The shaft 83 is also provided with a pinion 87 meshing with pinion 88 on the short shaft 89, also mounted in the bracket 81. This shaft 89 revolves in the opposite direction from the shaft 83 and is provided with a sprocket wheel 90 for driving a suitable conveyer to convey the cans to the machine. The bracket 81 also has pivoted to it one end of a link 91, shown in detail in Fig. 11, the opposite end of which carries a discharge arm 92 for insuring the movement of the cans from the disk 55 to the discharge conveyer. This arm 92 has an upper part which is arranged above the can guide 74 and a lower part which projects between said can guide and the pan 50. This lower part is provided with a projecting portion 93, shown in Fig. 11, which bears against the hub 70. When different sizes of cans are used, the position of the link 91 is varied so as to move the outer end of the discharge arm 92 laterally. At the same time, the bearing of the projection 93 against the hub 70 will automatically regulate the position of the inner end of said discharge arm.

Arranged above the can guide 74 is a sleeve 95 which surrounds the shaft 31, but is capable of rotation independently thereof. This sleeve 95 has secured to it at its lower end a disk 96 to which is secured an annular member 97, shown in detail in Figs. 7 and 9. This annular member 97 is provided with a number of openings 98 corresponding with the number of measures with which the machine is provided.

99 are a number of radially arranged arms corresponding in number with the openings 98, the inner ends of these arms 99 being pivotally secured to the annular member 97 by means of a small annular member 100, as best shown in Fig. 9. Each of the arms 99 is provided with an opening 101 into which projects a pair of lugs 102 for engaging with the discharge nozzles so as to raise the said nozzles out of or drop them into engagement with the can to be filled, as will be hereinafter described. The arms 99 are provided with bearings 103 which coöperate with members 104 carried on the disk 97 to guide the arms in their up and down movement. Each of the arms is provided at its outer end with a roller 105 which coöperates with a cam track 106, best shown in Fig. 1 of the drawings. This cam track 106 is preferably provided with two or more rolls 107 adapted to bear upon the edge of the annular member 97, as best shown in Fig. 1. The track 106 is supported by arms 108 from a ring 109 which carries the cut-off plates.

Figure 13:
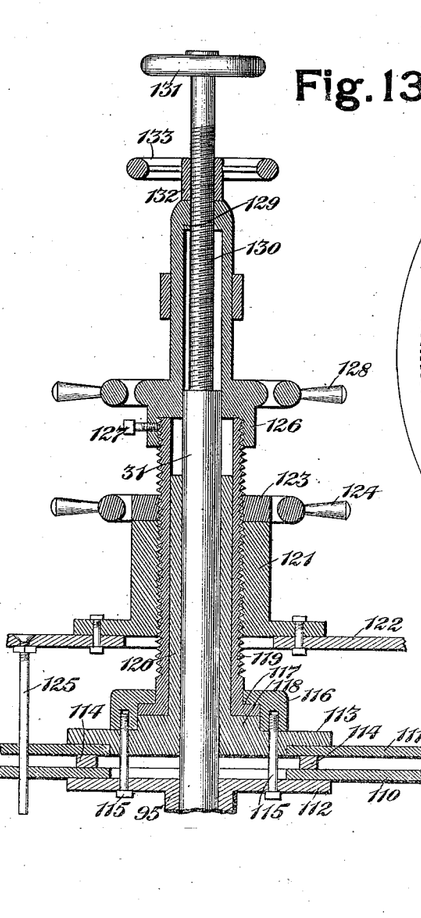
Fig. 13 is an enlarged sectional view, through its upper part, of the machine.

110 and 111 are a pair of disks between which the cut-off plates are arranged, as will be hereinafter described. These disks 110 and 111 are arranged at the upper end of the sleeve 95 and are held between a flange 112 on said sleeve and a disk 113, as best shown in Fig. 13. The disks 110 and 111 are separated by spacing blocks 114 and the various parts are secured together by means of bolts 115 passing through the flange 112 and the disk 113 and threaded into a cap 116. The cap 116 surrounds a flange 117 and a boss 118. The flange 117 is formed on the lower end of a sleeve 119, and the boss 118, together with an inner sleeve 120, is formed integral with the disk 113. The sleeve 119 is provided with threads which engage with corresponding threads on the interior of a collar 121 carrying a disk 122. It will be evident that when the sleeve 119 is rotated with respect to the collar 121, the disks 111 and 122 will be moved toward or away from each other. This is for the purpose of regulating the capacity of the measures, as will be hereinafter more fully described. In order to lock the collar 121 to the sleeve 119, I surround the said sleeve with a lock nut 123 adapted to bear on the upper end of the cam 121. This lock nut 123 is preferably provided with handles 124. The disk 122 carries a bolt 125 which is slidingly connected with the disks 110 and 111, so as to prevent rotation of these disks. Threaded on the upper end of the sleeve 119 is a cap piece 126 which forms a bearing for the upper end of the shaft 31. This cap piece 126 is secured in position on the sleeve by means of the set screw 127 and is preferably provided with handles 128 for rotating it together with the sleeve 119. The upper part of the cap piece 126 is threaded at 129, the threads being engaged with corresponding threads upon a short shaft 130, which shaft bears on the upper end of the shaft 31. This shaft 130 is provided with a hand wheel 131, by means of which it may be rotated to raise and lower that part of the machine above the disk 70. A lock nut 132 preferably provided with a hand wheel 133 is used for locking the shaft 130 to the cap piece 126.

Figure 14:
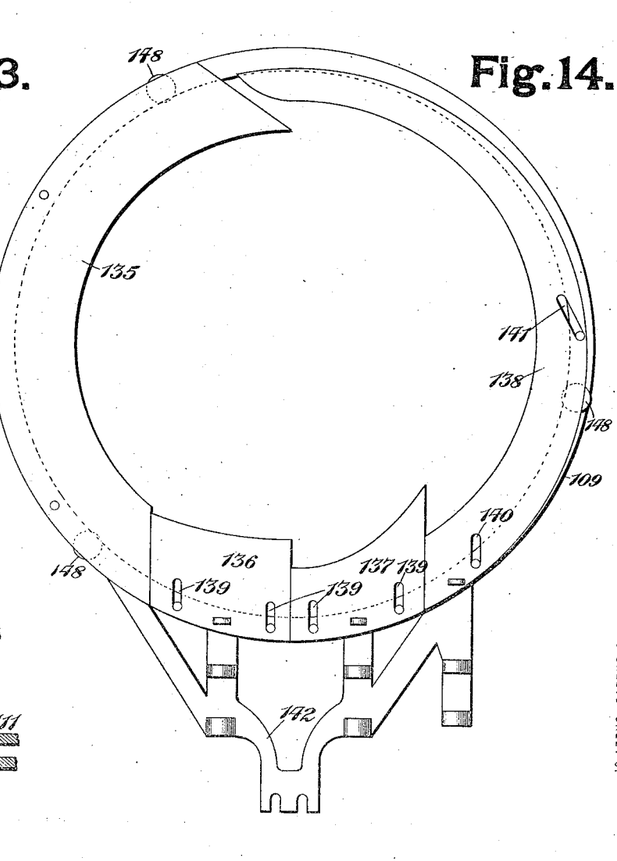
Fig. 14 is a bottom plan view, showing the arrangement of the cut-off plates.

Referring now to the cut-off plates which are arranged between the disks 110 and 111, the cut-off plate consists of four parts, as shown in detail in Fig. 14, namely, a fixed part 135, a pair of sliding parts 136 and 137, which move in a substantially radial direction in respect to the ring 109, and a part 138 which has a pivotal motion. The sliding parts 136, 137 are secured by means of radial slots 139. The pivotal movement of the part 138 is secured by means of a substantially radial slot 140 and a tangential slot 141, so that the end of the part 138 will be thrown laterally by an action of the slot 141 when the said part is moved. By adjusting the parts 136, 137 and 138 of the cut-off plate the amount of time required to discharge the material from the measures into the funnels may be regulated. This is very important in securing an even filling of the cans with various kinds of material. Carried by the ring 109 is a bracket 142 adapted to engage with an upright 143 carried by arms 144 secured to the upright 21. The engagement of the upright 143 with the bracket 142 prevents rotation of the cut-off plate by friction with the other parts. It is desirable to have two or more notches in the bracket 142 so that the cut-off plate as a whole may be slightly rotated to change the point at which the measures begin to discharge the material. This bracket 142 is provided with three screws 145, 146 and 147, as shown in Fig. 12, which screws operate the parts 136, 137 and 138 respectively. Carried by the ring 109 are antifriction rolls 148, preferably three in number, which rolls are adapted to bear upon the edge of the disk 111 so as to prevent friction between the parts when the disk is rotated. The disks 122, 110 and 111 are each provided with openings 150, preferably twenty in number, as shown in Fig. 12. These openings 150 in the disks 122, 111, are adapted to receive telescopic measures, as shown in detail in Fig. 3. Each of the measures consists of a top part 151 secured in the disk 122, a lower part 152 secured in the disk 111, and an intermediate part 153 arranged between the parts 151 and 152 adapted to be raised by the part 151. The said part 151 is supplied with a flange 154, and the part 153 with a flange 155, which engage as shown in Fig. 3.

It will be evident that when the disk 122 is moved relatively to the disk 111, the capacity of the telescopic measure will be varied. The upper part 151 of the measure is preferably slightly tapered, as shown in the drawing, so as to prevent the clogging of material in the measures. In order to prevent any material which may work through the joints of the measures from escaping into the room, the entire set of measures is surrounded by a telescopic guard consisting of an upper part 156, a lower part 157, and an intermediate part 158, which parts slide together in a manner similar to the parts of the measures. The openings 159 in the disk 110 are each provided with a downwardly projecting flange 160 to which is secured the upper end of a funnel 161 (see Fig. 8). This funnel 161 is made of canvas or other flexible material and is adapted to guide the material from the measure into the can. I prefer to secure the funnel 161 to the flange 160 by means of a metal band 162, as shown in Fig. 8 of the drawings. The lower part of the funnel 161 is secured to the discharge nozzle 163 which nozzle is provided with an inclined lower face adapted to make contact with the top of the can and thus secure a tight joint between the parts. This nozzle 164 is adapted to be engaged by the lugs 102 hereinbefore referred to, so that the nozzle will be controlled by the movement of the arms 99. Surrounding the funnel 161 is a coil spring 165 which holds the said funnel in normal position. If fine material is used in the machine, it is likely to adhere to the material of the funnel 161 if it is allowed to come into direct contact therewith. I prefer, therefore, to place inside of the funnel 161, when such material is used, a telescopic metal funnel consisting of an upper part 166 and a lower part 167 so that the material passing through the funnel is prevented from coming into direct contact with the canvas forming the funnel 161.

Surrounding the disk 122 is an annular member 170 within which is arranged a plate 171, best shown in Fig. 12. This plate 171 carries a lower part 172 of a telescopic connection, the upper part 173 of which is secured to the container 174 for holding the material to be fed to the cans. It will be understood that the part 173 is arranged directly over the fixed part 135 of the cut-off plate. Projecting from one end of the plate 171 is an arm 175 having an antifriction bearing 176 running on the upright 22. The arm 175 serves to hold the lower end 173 of the connection between the tank and measures. The friction of the parts would otherwise tend to twist this connection. It is desirable to use the antifriction bearings 176 to prevent binding of this arm when the parts are moved vertically to adjust the machine. A slide valve 177 controlled by a handle 178 is adapted to regulate the flow of material from the container 174 to the measures; in order to prevent the choking of material in the container 174 or the telescopic connection leading to the measures, I provide in the said container a shaft 179, and, in the connection, a small shaft 180, each of which shafts contain a number of beaters or paddles 181. In order to drive the shaft 179, the said shaft is provided with a belt wheel 183 around which passes a belt 184 also passing around the wheel 46 on the shaft 40, hereinbefore referred to.

185 is a belt tightener for tightening the belt 184.

In order to drive the shaft 180 from the shaft 179, each of the said shafts is provided with sprocket wheels 186, which wheels are surrounded by a sprocket chain 187. In order to automatically keep this chain 187 tight, as the shafts 179 and 180 are moved toward and away from each other, I provide a double toggle mechanism 189 carrying idle wheels 190 which engage with the chain 187 so that the chain will be automatically kept tight as the shafts are moved toward and away from each other. In order to jar the ring 170 and thus prevent the material from adhering to the sides of the measures, I provide a rod slidingly carried in a bracket 192, the upper end of this rod being provided with a finger 193 adapted to strike on the upper edge of the ring 170 and the lower end of the said rod being provided with an antifriction roll 194 coöperating with the wheel 48 to impart vertical movement to the rod.

The operation of my machine is as follows: The cans are brought to the machine by a conveyer, not shown, but operated by the sprocket wheel 90. The can is delivered below one of the discharge nozzles 163. The can is carried around toward the left, looking at Fig. 4, by the rotation of the plate 55 upon which it rests. After the can has been carried a slight distance, the roller 105 controlling the discharge nozzle above the can will move out of engagement with the track 106 so as to allow the discharge nozzle to be forced down by the coil spring 165, thus making a tight joint between the discharge nozzle and the can. As the can moves around the machine, the powder or other material to be fed into the can will be allowed to discharge gradually through the funnel 161 into the can, the amount of this discharge being regulated by the position of the plates 136, 137 and 138 forming the cut-off plate. As the can passes around the machine, the levers 59 will be actuated by the engagement of the arms 58 with the teeth 66 carried by the plate 55 so that the stems 57 of the supporting plates 56 will be struck causing the material to settle down into the cans. At the same time, the rotation of the wheel 48 will lift and drop the rod 191, the arm 193 of which will strike upon the annular member 170 and thus jar the measures and prevent the material from adhering to their sides. After the material has been discharged into the cans, the same will come into contact with the end of the discharge arm 92 and will be delivered to the conveyer actuated by the sprocket wheel 86. When it is desired to adapt the machine for a different height of can, it will be necessary, first, to loosen the lock nut 132 by rotating the hand wheel 133 and then turning the hand wheel 131 so as to move the entire portion of the machine above the plate 70, so as to secure the right height for the can below the discharge nozzle 163. After the machine is thus adjusted for the height of the can, it will be necessary to loosen the lock nut 123 by rotating the handles 124 and then rotating the sleeve 119 and its attached part 126 by means of the handles 128 so as to cause the plates 111 and 122 to approach or recede from each other so as to adjust the telescopic measures to deliver the proper quantity of material to the cans.

Having fully described my invention, what I claim as new and desire to secure by Letters Patent of the United States is:

1. In a can filling machine, the combination with a plurality of traveling measures, of means for supporting cans, discharge nozzles, connections of flexible material between said nozzles and measures, and means for reciprocating said nozzles to secure a tight joint between the said nozzles and the mouth of the can to be filled.

2. In a can filling machine, the combination with a plurality of traveling measures, of means for supporting cans, discharge nozzles, flexible connections between said nozzles and measures, telescopic funnels of rigid material within said flexible connections, and means for reciprocating said nozzles to form a tight joint between said nozzles and the mouths of the cans to be filled.

3. In a can filling machine, the combination with a plurality of traveling measures, of means for supporting cans, discharge nozzles, flexible funnels connecting said measures and nozzles, and means for reciprocating said nozzles to form a tight joint between said nozzles and the mouths of the cans to be filled.

4. In a can filling machine, the combination with a plurality of traveling measures, of means for supporting cans, discharge nozzles, flexible funnels connecting said measures and nozzles, telescopic funnels of rigid material within said flexible funnels, and means for reciprocating said nozzles to secure a tight joint between said nozzles and the mouths of the cans to be filled.

5. In a can filling machine, the combination with a plurality of traveling measures, of means for supporting cans, discharge nozzles, flexible funnels connecting said nozzles and measures, radially disposed pivoted arms carrying said discharge nozzles, and means for actuating said arms to reciprocate said nozzles.

6. In a can filling machine, the combination with a plurality of traveling measures, of means for supporting cans, discharge nozzles, flexible funnels connecting said nozzles and measures, radially disposed pivoted arms carrying said nozzles, and a cam track for actuating said arms to reciprocate said nozzles.

7. In a can filling machine, the combination with a plurality of rotary measures, of means for supporting cans, discharge nozzles, flexible connections between said measures and nozzles, and means for reciprocating the nozzles to secure a tight joint between the cans and the nozzles.

8. In a can filling machine, the combination with a plurality of rotary measures, of means for supporting cans, discharge nozzles, flexible funnels connecting said nozzles and said measures, springs surrounding said funnels, and means for reciprocating said nozzles.

9. In a can filling machine, the combination with a plurality of rotary measures, of means for supporting cans, discharge nozzles, flexible funnels connecting said nozzles to said measures, telescopic funnels of rigid material within said flexible funnels, and means for reciprocating said nozzles.

10. In a can filling machine, the combination with a plurality of rotary measures, of means for supporting cans, discharge nozzles, flexible funnels connecting said nozzles and measures, springs surrounding said funnels, telescopic funnels of rigid material within said flexible funnels, and means for reciprocating said nozzles.

11. In a can filling machine, the combination with a plurality of rotary measures, of means for supporting cans, discharge nozzles, flexible connections between said measures and nozzles, radially disposed pivoted arms carrying said nozzles, and means for actuating said arms to reciprocate said nozzles.

12. In a can filling machine, the combination with a plurality of rotary measures, of means for supporting cans, discharge nozzles, flexible funnels connecting said nozzles to said measures, springs surrounding said funnels, radially disposed pivoted arms carrying said nozzles, and means for actuating said arms to reciprocate said nozzles.

13. In a can filling machine, the combination with a plurality of rotary measures, of means for supporting cans, discharge nozzles, flexible funnels connecting said nozzles to said measures, telescopic funnels of rigid material within said flexible funnels, radially disposed pivoted arms carrying said nozzles, and means for actuating said arms to reciprocate said nozzles.

14. In a can filling machine, the combination with a plurality of rotary measures, of means for supporting cans, discharge nozzles, flexible funnels connecting said nozzles and measures, springs surrounding said funnels, telescopic funnels of rigid material in said flexible funnels, radially disposed pivoted arms for carrying said nozzles, and means for actuating said arms to reciprocate said nozzles.

15. In a can filling machine, the combination with a plurality of rotary measures, of a table arranged below said measures, supporting pieces movably carried by said table, a toothed flange carried by said table, and striking mechanism actuated by said toothed flange for operating on said supporting pieces.

16. In a can filling machine, the combination with a plurality of rotary measures, of a member supporting the upper ends of said measures, a striking device operating on said member, and a toothed wheel for actuating said striking device.

17. In a can filling machine, the combination with a pair of rotary disks moving toward and away from each other, of telescopic measures carried by said disks, and a telescopic annular guard surrounding said measures.

18. In a can filling machine, the combination with a container, of a rotary measure carrier, a telescopic connection between said container and measure carrier, an agitator for said container, an agitator for said connection, a sprocket drive for said agitators, and toggle mounted idlers for automatically adjusting said sprocket drive.

19. In a can filling machine, the combination with a plurality of rotary measures, of a can supporting member below said measures, a rotary guide arranged between said measures and said can supporting member, and adjusting means for rotating said guide relative to said measures.

20. In a can filling machine, the combination with a plurality of rotary measures, of a can supporting member below said measures, a shaft carrying said parts, a member keyed to said shaft, a guide connecting said members, and a pair of set screws carried by said guide and bearing on said latter member to rotate said guide relative to said measures.

21. In a can filling machine, the combination with a supply hopper, of a plurality of rotary measures adapted to be filled from said hopper, and a cut-off plate for closing the lower ends of said measures, said cut-off plate comprising a plurality of independently adjusted parts.

22. In a can filling machine, the combination with a supply hopper, of a plurality of rotary measures adapted to be filled from said hopper, and a cut-off plate for closing the lower ends of said measures, said cut-off plates comprising a fixed part and an adjustable part.

23. In a can filling machine, the combination with a supply hopper, of a plurality of rotary measures adapted to be filled from said hopper, and a cut-off plate for closing the lower ends of said measures, said cut-off plate comprising a fixed part and a plurality of independently adjusted parts.

24. In a can filling machine, the combination with a supply hopper, of a plurality of rotary measures adapted to be filled from said hopper, and a cut-off plate for closing the lower ends of said measures, said cut-off plate comprising a fixed part, a slidingly adjusted part, and an eccentrically adjusted part.

25. In a can filling machine, the combination with a rotary member carrying cans, of means for supplying material to fill said cans, a discharge arm for guiding the cans from said rotary member, and a link adjustment with the outer end of said arm.

26. In a can filling machine, the combination with a rotary member carrying cans, of means for supplying material to fill the cans, a discharge arm for guiding the cans from said rotary member, and a link adjustment with the outer end of said arm, the inner end of said arm bearing on a portion of said rotary member whereby the inner end of said arm is automatically adjusted.

27. In a can filling machine, the combination with a vertical shaft, of can supporting means mounted on said shaft, a second shaft bearing on the upper end of said first named shaft, measuring devices supported from said second named shaft, and adjustable connections between said second shaft and said measuring devices.

28. In a can filling machine, the combination with a vertical shaft, of can supporting means mounted on said shaft, a second shaft bearing on the upper end of said first named shaft, measuring devices supported from said second named shaft, and a sleeve surrounding the upper end of said first named shaft and the lower end of said second named shaft and having threaded connection with said latter shaft.

29. In a can filling machine, the combination with a vertical shaft, of can supporting means mounted on said shaft, a second shaft bearing on the upper end of said first named shaft, measuring devices supported from said second shaft, a sleeve surrounding the upper end of said first named shaft and the lower end of said second named shaft and having threaded connection with said latter shaft, and a collar threaded on said sleeve for adjusting the measuring devices.

In testimony whereof, I have hereunto set my hand and affixed my seal in the presence of the two subscribing witnesses.

CHESLEY T. SMALL. [L. S.]

Witnesses:
W. A. ALEXANDER,
G. M. SHORE.